(12) United States Patent  
Li et al.

(10) Patent No.: US 9,134,934 B2
(45) Date of Patent: Sep. 15, 2015

(54) LAYOUT INFORMATION CALIBRATING METHOD AND APPARATUS

(71) Applicants: PEKING UNIVERSITY FOUNDER GROUP CO., LTD., Beijing (CN); BEIJING FOUNDER ELECTRONICS CO., LTD., Beijing (CN)

(72) Inventors: Jia Li, Beijing (CN); Qianqian Xie, Beijing (CN); Shaokun Shi, Beijing (CN)

(73) Assignees: PEKING UNIVERSITY FOUNDER GROUP CO., LTD., Beijing (CN); BEIJING FOUNDER ELECTRONICS CO., LTD., Beijing (CN)

( * ) Notice: Subject to any disclaimer, the term of this patent is extended or adjusted under 35 U.S.C. 154(b) by 0 days.

(21) Appl. No.: 14/093,801

(22) Filed: Dec. 2, 2013

(65) Prior Publication Data

US 2014/0192381 A1   Jul. 10, 2014

(30) Foreign Application Priority Data

Jan. 9, 2013   (CN) .......................... 2013 1 0008128

(51) Int. Cl.
*G06F 15/00* (2006.01)
*G06F 3/12* (2006.01)

(52) U.S. Cl.
CPC .............. *G06F 3/1208* (2013.01); *G06F 3/125* (2013.01); *G06F 3/1282* (2013.01)

(58) Field of Classification Search
USPC ........................................................ 358/1.18
See application file for complete search history.

(56) References Cited

U.S. PATENT DOCUMENTS

| | | | |
|---|---|---|---|
| 2003/0115569 A1* | 6/2003 | Ikeuchi ........................... | 716/19 |
| 2004/0122806 A1* | 6/2004 | Sang et al. ........................ | 707/3 |
| 2007/0204220 A1* | 8/2007 | Petrov Nickolov et al. .. | 715/530 |
| 2011/0164283 A1* | 7/2011 | Sadasue et al. .............. | 358/1.16 |

* cited by examiner

*Primary Examiner* — Saeid Ebrahimi Dehkord
(74) *Attorney, Agent, or Firm* — Hamre, Schumann, Mueller & Larson, P.C.

(57) ABSTRACT

The present invention provides a layout information calibrating method and device, wherein the calibrating method comprises: obtaining the parameter calibrating standard of layout information and layout information to be calibrated; matching the layout information to be calibrated with the parameter calibrating standard of the layout information; if the layout information to be calibrated is consistent with the parameter calibrating standard of the layout information, sending the information indicating the layout information is successfully calibrated; if the layout information to be calibrated is inconsistent with the parameter calibrating standard of the layout information, sending a reminder indicating the layout information is not successfully calibrated. Adopting the layout information calibrating method and device submitted in the present invention, it is possible to not only effectively avoid calibrating mistakes in the layout production process, but also reduce layout production accidents, accelerate the whole production schedule of the newspaper.

13 Claims, 2 Drawing Sheets

LAYOUT INFORMATION CALIBRATING METHOD AND APPARATUS

TECHNICAL FIELD

The present invention relates to typesetting technical field, especially relates to a layout information calibrating method and apparatus.

BACKGROUND

At present, layout information in a newspaper refers to the whole page information of the newspaper except edit parts such as content typesetting in the layout, etc., for example, XXX Daily in the header and footer of the newspaper is a masthead, etc., which is an instance of the layout information. The page information mainly comprises information such as the right or left position of a masthead icon in the layout, the color mode of the masthead icon, if the layout maintaining an advertisement placeholder picture or not, whether the layout is a serial layout or not, and the like. The page information is a critical data part in the layout production process. In a newspaper, different layouts correspond to different page information, as well as correspond to different processing flows in the production.

In the production process of the traditional newspaper printing, checking the page information generated after imposition is mainly depending on an artificial proof But in the process of proofing, what mainly calibrated are page contents, fonts, typesetting, etc., by comparing, thus, it is easy to omit specific page information. In this way, in the production process of the newspaper, if a page information mistake was made in editing a layout, which is omitted in the proof, this will course an accident in producing the current layout, which affects the whole production schedule of the newspaper.

SUMMARY

In view of the defects existing in the prior art, a purpose of the present invention is to provide a layout information calibrating method and device .

The present invention provides a layout information calibrating method , comprising:

Obtaining a parameter calibrating standard of layout information and layout information to be calibrated;

Matching the layout information to be calibrated with the parameter calibrating standard of the layout information;

If the layout information to be calibrated is consistent with the parameter calibrating standard of the layout information, sending the information indicating the layout information is successfully calibrated;

If the layout information to be calibrated is inconsistent with the parameter calibrating standard of the layout information, sending a reminder indicating the calibrating is failed.

The present invention also provides a layout information calibrating device, comprising:

An information acquisition unit, configured to obtain a parameter calibrating standard of layout information and the layout information to be calibrated;

A matching unit: configured to match the layout information to be calibrated with the parameter calibrating standard of layout information;

An information reminding unit, if the layout information to be calibrated is consistent with the parameter calibrating standard of layout information, configured to send information indicating the layout information is successfully calibrated; or, if the layout information to be calibrated is inconsistent with the parameter calibrating standard of the layout information, send a reminding indicating the layout information is not successfully calibrated The layout information calibrating method and device provided in the present invention matching the layout information to be calibrated with the parameter calibrating standard of the layout information, by obtaining the parameter calibrating standard of the layout information and the layout information to be calibrated automatically; if the layout information to be calibrated is consistent with the parameter calibrating standard of the layout information, sending information indicating the layout information is successfully calibrated; if the layout information to be calibrated is inconsistent with the parameter calibrating standard of the layout information, sending a reminder indicating the layout information is not successfully calibrated. Adopting the layout information calibrating method and device submitted in the present invention, it is possible to not only effectively avoid calibrating mistakes in the layout production process, but also reduce layout production accidents, accelerate the whole production schedule of the newspaper.

DETAILED DESCRIPTION

The following, the detailed description of the layout information calibrating method and device provided by the embodiments of the present invention with be made with reference to the drawings.

Figure 1:
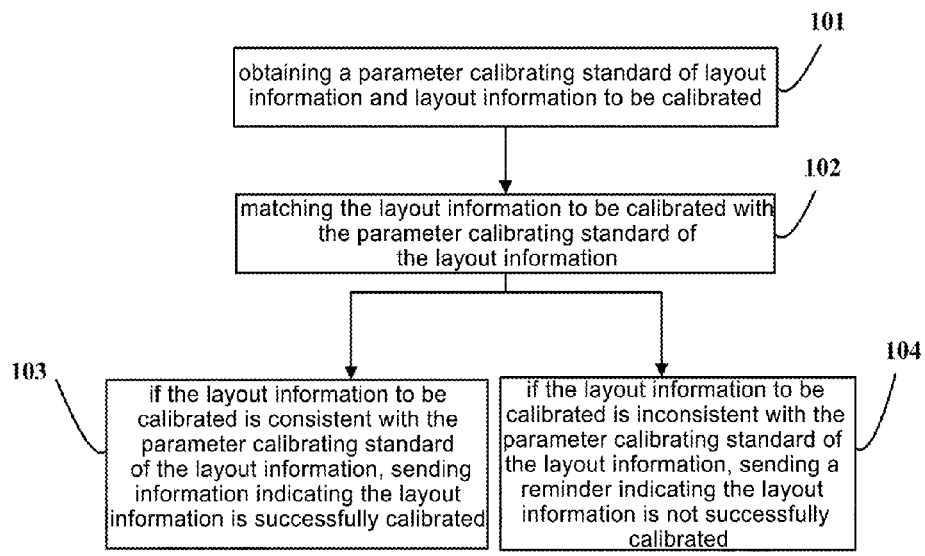
FIG. 1 is a flow chart illustrating a layout information calibrating method provided by the embodiment of the present invention.

As shown in FIG. 1, illustrating the layout information calibrating method provided by the embodiments of the present invention, the method comprises:

101: obtaining a parameter calibrating standard of layout information and layout information to be calibrated; the parameter calibrating standard comprises: settings of the left or right position of a masthead icon in an odd or even page layout, settings of a color mode of the masthead icon, default parameter information for using an advertisement placeholder picture, a standard of serial layouts. The layout information to be calibrated comprises: a layout number of the layout to be calibrated, the color mode of the picture used as the masthead icon, the left or right position of the masthead icon being used, information of the advertisement placeholder picture in the content typesetting in the layout to be calibrated, and a layout width of a layout to be calibrated.

102: matching the layout information to be calibrated with the parameter calibrating standard of the layout information;

103: if the layout information to be calibrated is consistent with the parameter calibrating standard of the layout information, sending information indicating the layout information is successfully calibrated;

104: if the layout information to be calibrated is inconsistent with the parameter calibrating standard of the layout information, sending a reminder indicating the layout information is not successfully calibrated.

Figure 2:
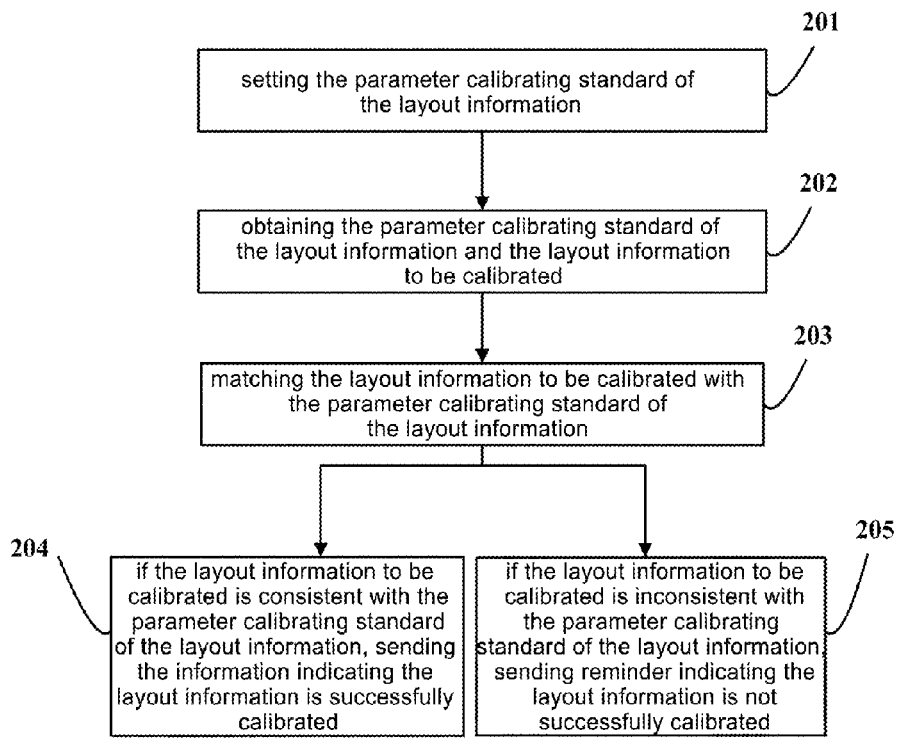
FIG. 2 is a flow chart illustrating a layout information calibrating method provided by the embodiment of the present invention.

Based on the above embodiment, as shown in FIG. 2, is a flowchart illustrating a specific performance of the layout information calibration method provided by the embodiment of the present invention, which specifically comprises:

201: setting the parameter calibrating standard of the layout information; the parameter calibrating standard comprises: settings of the left or right position of the masthead icon in an odd or even layout, settings of the color mode of the masthead icon, default parameter information for using the advertisement placeholder picture, the standard of serial layouts.

The default parameter information for using the advertisement placeholder picture comprises: a name of the advertisement placeholder picture; and the standard of serial layouts comprises: a standard initial width of the serial layout. The standard initial width of the serial layout may be set as the minimal width requirement of the serial layout.

202: obtaining the parameter calibrating standard of the layout information and the layout information to be calibrated; the layout information to be calibrated comprises: the layout number of the layout to be calibrated, the color mode of the picture used as the masthead icon, the left or right position of the masthead icon being used, the information of the advertisement placeholder picture in the content typesetting in the layout to be calibrated, and the layout width of the layout to be calibrated.

203: matching the layout information to be calibrated with the parameter calibrating standard of the layout information; the specific performances of the step of matching are as the following:

S1: matching the layout information to be calibrated with the parameter calibrating standard of the layout information according to the parity of the layout number of the layout to be calibrated, determining whether the left or right position and the color mode of the masthead icon corresponding to the layout number are consistent with the parameter calibrating standard; for example, according to the parity of the page number of the layout to be calibrated and the parameter calibrating information that has been set, judging whether the position and color mode of the current masthead of the layout to be calibrated are consistent with the parameter calibrating standard, such as an odd page layout corresponds to a black and white masthead on the left side, an even page layout corresponds to a colorful masthead picture on the right side; if they are consistent, executing step 204; if they are not inconsistent, executing step 205.

S2: matching the layout information to be calibrated with the parameter calibrating standard of the layout information according to the information of the advertisement placeholder picture in the content typesetting in the layout to be calibrated, judging whether the content of the layout to be calibrated contains the default parameter information for using the advertisement placeholder picture in the parameter calibrating standard. For example: extracting all information on the embedded pictures of the current layout from the current layout information to be calibrated, finding out whether the embedded pictures information maintaining an advertisement placeholder picture that has been set, if it does maintain an advertisement place holder picture, it will be considered as there are still advertisement pictures not being correctly embedded to the layout yet, therefore, the layout is not complete, proceeding to step 205; if it does not maintain an advertisement place holder picture, it is considered that the advertisement pictures are correctly embedded to the layout, thus, the layout is complete, proceeding to step 204.

S3: matching the layout information to be calibrated with the parameter calibrating standard of the layout information according to the layout width of the layout to be calibrated, determining whether the layout to be calibrated is a serial layout. For example: obtaining the width of the current layout from the layout information to be calibrated, discriminating whether it exceeds a minimum serial layout width according to the parameter calibrating standard that has been set, if it exceeds the minimum serial layout width, it is considered as being a serial layout, proceed to step 205; if it doesn't exceed the minimum serial layout width, it is considered not being a serial layout, proceed to step 204.

204: if the layout information to be calibrated is consistent with the parameter calibrating standard of the layout information, sending information indicating the calibrating is succeeded.

205: if the layout information to be calibrated is inconsistent with the parameter calibrating standard of the layout information, sending a reminder indicating the layout information is not successfully calibrated.

Figure 3:
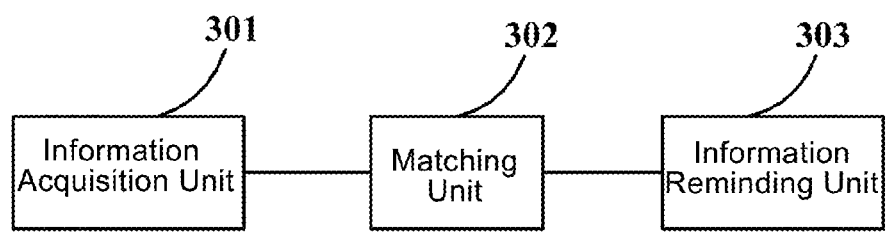
FIG. 3 is a structure schematic illustrating a layout information calibrating device provided by the embodiments of the present invention.

As shown in FIG. 3, illustrating a layout information calibrating device provided by the embodiment of the present invention, the device comprises:

An information acquisition unit 301, configured to obtain a parameter calibrating standard of layout information and layout information to be calibrated.

A matching unit 302: configured to match the layout information to be calibrated with the parameter calibrating standard of the layout information.

The matching unit 302 specifically comprises:

a position and color matching subunit, configured to match the layout information to be calibrated with the parameter calibrating standard of the layout information according to the parity of the layout number of the layout to be calibrated, determine whether the left or right position and the color mode of the masthead icon corresponding to the layout number are consistent with the parameter calibrating standard;

An advertisement placeholder matching subunit, configured to match the layout information to be calibrated with the parameter calibrating standard of the layout information according to the information of the advertisement placeholder picture in content typesetting in the layout to be calibrated, judge whether the content of the layout to be calibrated contains the default parameter information of the advertisement placeholder picture used in the parameter calibrating standard;

A serial layout matching subunit, configured to match the layout information to be calibrated with the parameter calibrating standard of the layout information according to the layout width of the layout to be calibrated, determine whether the layout to be calibrated is a serial layout.

An information reminding unit 303, configured to, if the layout information to be calibrated is consistent with the parameter calibrating standard of layout information, send information indicating the layout information is successfully calibrated; or, if the layout information to be calibrated is inconsistent with the parameter calibrating standard of the layout information, send a reminder indicating the layout information is not successfully calibrated.

It should be noted that, the device also comprises:

A setting unit, configured to set the parameter calibrating standard of the layout information; the parameter calibrating standard comprises: settings of the position of the masthead icon in an odd page or an even page, settings of the color mode of the masthead icon, default parameter information for using the advertisement placeholder picture, a standard of serial layouts.

It should also be noted that, the default parameter information for using the advertisement placeholder picture comprises: a name of the advertisement placeholder picture; and the standard of serial layouts comprises: a standard initial width of the serial layout.

It should also be noted that, the layout information to be calibrated comprises: the layout number of the layout to be calibrated, the color mode of the picture used as the masthead icon, the left or right position of the masthead icon being used, the information of the advertisement placeholder picture in the content typesetting in the layout to be calibrated, and the layout width of the layout to be calibrated.

The layout information calibrating method and device provided in the present invention matches the layout information to be calibrated with the parameter calibrating standard of the layout information, by obtaining the parameter calibrating standard of the layout information and the layout information to be calibrated automatically; if the layout information to be calibrated is consistent with the parameter calibrating standard of the layout information, sending the information indicating the layout information is successfully calibrated; if the layout information to be calibrated is inconsistent with the parameter calibrating standard of the layout information, sending the reminder indicating the layout information is not successfully calibrated. Adopting the layout information calibrating method and device submitted in the present invention, it is possible to not only effectively avoid calibrating mistakes in the layout production process, but also reduce layout production accidents, accelerate the whole production schedule of the newspaper.

Those skilled in the art may understand that it is possible to instruct relevant hardware to perform the entire or partial steps of the method in the embodiment mentioned above by programs, which can be stored in a computer readable storage medium, when the programs are executed, it performs the steps of the method mentioned above, and the storage medium should be, such as, ROM/RAM, disk, CD, etc.

The all mentioned above are only detailed descriptions of the embodiment of the present invention, the protection scope of the present invention does not restrict to this, a person skilled in the art can easily think of a variation or modification within the technical scope exposed in the present invention, which should be covered in the protection scope of the present invention. Therefore, the protection scope of the present invention should be subject to the scope of the claims.

What is claimed is:

1. A layout information calibrating method used for printing, comprising:
   setting a parameter calibrating standard of the information, the parameter calibrating standard further comprising: settings of a left or right position of a masthead icon in an odd or even page, settings of a color mode of the masthead icon, default parameter information for using an advertisement placeholder picture, a standard of serial layouts;
   obtaining the parameter calibrating standard of layout information and layout information to be calibrated;
   matching the layout information to be calibrated with the parameter calibrating standard of the layout information;
   if the layout information to be calibrated is consistent with the parameter calibrating standard of the layout information, sending information indicating the layout information is successfully calibrated;
   if the layout information to be calibrated is inconsistent with the parameter calibrating standard of the layout information, sending a reminder indicating the layout information is not successfully calibrated.

2. The layout information calibrating method according to claim 1, wherein
   the default parameter information for using an advertisement placeholder picture comprises: a name of the advertisement placeholder picture; and
   the standard of the serial layouts comprises: a standard initial width of the serial layouts.

3. The layout information calibrating method according to claim 2, wherein the layout information to be calibrated comprises: a layout number of the layout to be calibrated, a color mode of a picture used as the masthead icon, the left and/or right position of the masthead icon being used, information of the advertisement placeholder picture in content typesetting in the layout to be calibrated, and a layout width of the layout to be calibrated.

4. The layout information calibrating method according to claim 1, wherein the layout information to be calibrated comprises: a layout number of the layout to be calibrated, a color mode of a picture used as the masthead icon, the left or right position of the masthead icon being used, information of the advertisement placeholder picture in content typesetting in the layout to be calibrated, and a layout width of the layout to be calibrated.

5. The layout information calibrating method according to claim 4, wherein the step of matching the layout information to be calibrated with the parameter calibrating standard of the layout information comprise:
   matching the layout information to be calibrated with the parameter calibrating standard of the layout information according to the parity of the layout number of the layout to be calibrated, determining whether the left or right position and the color mode of the masthead icon corresponding to the layout number are consistent with the parameter calibrating standard;
   matching the layout information to be calibrated with the parameter calibrating standard of the layout information according to the information of the advertisement placeholder picture in the content typesetting in the layout to be calibrated, judging whether content of the layout to be calibrated contains the default parameter information for using the advertisement placeholder picture in the parameter calibrating standard;
   matching the layout information to be calibrated with the parameter calibrating standard of the layout information according to the layout width of the layout to be calibrated, determining whether the layout to be calibrated is a serial layout.

6. The layout information calibrating method according to claim 1, wherein the layout information to be calibrated comprises: a layout number of the layout to be calibrated, a color mode of a picture used as the masthead icon, the left and/or right position of the masthead icon being used, information of the advertisement placeholder picture in content typesetting in the layout to be calibrated, and a layout width of the layout to be calibrated.

7. A layout information calibrating device used for printing, comprising:
   a setting unit, configured to set a parameter calibrating standard of the layout information; the parameter calibrating standard further comprising: settings of a left or right position of a masthead icon in an odd or even page, settings of a color mode of the masthead icon, default parameter information for using an advertisement placeholder picture, a standard of serial layouts;

an information acquisition unit, configured to obtain the parameter calibrating standard of layout information and layout information to be calibrated;

a matching unit, configured to match the layout information to be calibrated with the parameter calibrating standard of the layout information;

an information reminding unit, configured to, if the layout information to be calibrated is consistent with the parameter calibrating standard of the layout information, send information indicating the layout information is successfully calibrated; or, if the layout information to be calibrated is inconsistent with the parameter calibrating standard of the layout information, send a reminder indicating the layout information is not successfully calibrated.

8. The layout information calibrating device according to claim 7, wherein the default parameter information for using advertisement placeholder picture comprises: a name of the advertisement placeholder picture; and the standard of serial layouts comprises: a standard initial width of the serial layouts.

9. The layout information calibrating device according to claim 8, wherein the layout information to be calibrated comprises: a layout number of the layout to be calibrated, a color mode of a picture used as the masthead icon, the left or right position of the masthead icon being used, information of advertisement placeholder picture in content typesetting of the layout to be calibrated, and a layout width of the layout to be calibrated.

10. The layout information calibrating device according to claim 7, wherein the layout information to be calibrated comprises: a layout number of the layout to be calibrated, a color mode of a picture used as the masthead icon, the left or right position of the masthead icon being used, information of advertisement placeholder picture in content typesetting of the layout to be calibrated, and a layout width of the layout to be calibrated.

11. The layout information calibrating device according to claim 10, wherein the matching unit comprises:

a position and color matching subunit, configured to match the layout information to be calibrated with the parameter calibrating standard of the layout information according to the parity of the layout number of the layout to be calibrated, determine whether the left or right position and the color mode of the masthead icon corresponding to the layout number are consistent with the parameter calibrating standard;

an advertisement placeholder matching subunit, configured to match the layout information to be calibrated with the parameter calibrating standard of the layout information according to the information of the advertisement placeholder picture in the content typesetting in the layout to be calibrated, judge whether content of the layout to be calibrated contains the default parameter information of the advertisement placeholder picture used in the parameter calibrating standard;

a serial layout matching subunit, configured to match the layout information to be calibrated with the parameter calibrating standard of the layout information according to the layout width of the layout to be calibrated, determine whether the layout to be calibrated is a serial layout.

12. The layout information calibrating device according to claim 7, wherein the layout information to be calibrated comprises: a layout number of the layout to be calibrated, a color mode of a picture used as the masthead icon, the left or right position of the masthead icon being used, information of advertisement placeholder picture in content typesetting of the layout to be calibrated, and a layout width of the layout to be calibrated.

13. A non-transitory storage medium that stores a computer program, comprising instructions make a processor execute the method according to claim 1.

\* \* \* \* \*